United States Patent
Yao et al.

(10) Patent No.: US 6,987,588 B2
(45) Date of Patent: Jan. 17, 2006

(54) TEXT AND IMAGE QUALITY ENHANCEMENT

(75) Inventors: Meng Yao, West Linn, OR (US);
Michael T. Stevens, Aloha, OR (US);
Mark R. Parker, Portland, OR (US)

(73) Assignee: Xerox Corporation, Stamford, CT (US)

( * ) Notice: Subject to any disclaimer, the term of this patent is extended or adjusted under 35 U.S.C. 154(b) by 971 days.

(21) Appl. No.: 09/888,667

(22) Filed: Jun. 25, 2001

(65) Prior Publication Data
US 2003/0011794 A1    Jan. 16, 2003

(51) Int. Cl.
*H04N 1/40*    (2006.01)
(52) U.S. Cl. .................... 358/3.14; 358/3.06
(58) Field of Classification Search ............ 358/1.9, 358/2.1, 306–3.15, 3.2; 382/237
See application file for complete search history.

(56) References Cited

U.S. PATENT DOCUMENTS 5,483,355 A  *  1/1996  Overton .................... 358/463

* cited by examiner

*Primary Examiner*—Thomas D. Lee
*Assistant Examiner*—Stephen Brinch
(74) *Attorney, Agent, or Firm*—William Eipert

(57) ABSTRACT

A method to compensate for dot placement errors includes receiving image data comprising a plurality of pixels, each having at least two states, a first corresponding to depositing no ink and a second corresponding to depositing ink; identifying a stray pixel pattern within the image data, the stray pixel pattern including a stray pixel corresponding to a misplaced dot in a dot pattern; and modifying the image data corresponding to the stray pixel pattern by setting the stray pixel to the first state and changing a second pixel from the first state to the second state.

11 Claims, 2 Drawing Sheets

TEXT AND IMAGE QUALITY ENHANCEMENT

BACKGROUND

The present invention is directed to enhancing the quality of text and images generated by printing devices. More particularly, the present invention is directed to a method for improving image quality degraded by dot placement errors.

Ink deposition printers such as piezoelectric, acoustic, phase change, or thermal, conventionally employ at least one printhead from which droplets of ink are directed towards an imaging surface. The imaging surface may comprise an output sheet or an intermediate transfer surface from which ink is transferred to an output sheet. Typically, ink is stored within the printer in a liquid form and fed to the printhead. Droplets of ink are expelled in a raster fashion from jets (orifices or nozzles) in the printhead. In a solid ink printer, solid ink sticks are typically stored in an ink supply unit. Conventionally, the ink supply unit supplies molten ink to a reservoir by the melting of the solid ink sticks. The ink is maintained in a liquid state in the reservoir and fed to the printhead for propulsion upon demand, most normally through the use of piezo-electric transducers.

Ink deposition printers can provide very good image quality when dots can be placed reliably and accurately. However, when dot positioning (dot placement) is less accurate or reliable, there can be a noticeable reduction of image quality. There are a variety of factors that can contribute to dot positioning errors. One source of dot placement error results from inconsistencies and/or contaminants in the ink as well as the use of non standard inks. These may vary the flow rate in the print head, cause the ink to foul or clog nozzles in the print head, or change the thermal characteristics of the ink. Each of these can cause variations in the amount and the location of ink deposition. Additionally, design choices and/or manufacturing flaws can impact the rate ink flows through or discharges from the print head; thereby resulting in inconsistent and inaccurate drop placement. Another type of dot misplacement, which can result in a misplacement of as much as several pixels, depends on a particular dot pattern or firing frequency.

Dot misplacement can cause a variety of problems including noisy halftone output and degraded text and line quality. Another problem caused by dot misplacement manifests itself as severe color banding as a result of dot placement errors combined with jet to jet variation. The problem is most noticeable in dark color fills, especially in a uniform tertiary color that covers the page with approximately 33% secondary dots (red, green or blue) and 67% black dots. For example, it has been found that when red dots and black dots form certain patterns in a row or column (solid ink printers print dots in columns), dot misplacement can cause some of the magenta and yellow dots to overlap the black dots, resulting in large hue shifts and loss of saturation. This problem is exacerbated by jet to jet variation which will cause some rows (columns) to change more than others, resulting in severe bands, the appearance of which can range from brown to muddy yellow green to dark gray.

SUMMARY

There is described herein a method that improves the quality of text and pictorial image degraded as a result of dot misplacement. The method includes receiving image data comprising a plurality of color planes, the color planes including at least one black plane and at least one non-black plane, wherein each color plane comprises an array of separation pixels, each separation pixel having at least two states, a first state corresponding to depositing no ink and a second state corresponding to depositing ink; identifying a stray pixel pattern within the image data, the stray pixel pattern including at least one stray separation pixel which corresponds to a misplaced dot in a dot pattern; and modifying the image data, the modification of the image data including setting the stray separation pixel to the first state and setting at least one other separation pixel within the stray pixel pattern to the second state.

There is further provided a method of improving the quality of text output. The method includes receiving image data comprising a plurality of pixels, each pixel having at least two states, a first state corresponding to depositing no ink and a second state corresponding to depositing ink; identifying a stray pixel pattern within the image data, the stray pixel pattern including a stray pixel corresponding to a misplaced dot in a dot pattern; and modifying the image data corresponding to the stray pixel pattern to match a second stray pixel pattern, the second stray pixel pattern being selected to produce a dot pattern corresponding to the stray pixel pattern.

There is further provided a method of improving image quality by reducing color banding artifacts resulting from the combined effects of dot misplacement and jet to jet variation. The method includes receiving image data comprising a plurality of color planes, the color planes including a black separation and at least two non-black separations, wherein each color separation comprises an array of separation pixels, each separation pixel having at least two states, a first state corresponding to depositing no ink and a second state corresponding to depositing ink; identifying a stray pixel pattern within the image data, the stray pixel pattern comprising a pair of non-black separation pixels having a second state separated by a predetermined number of black separation pixels having a second state; modifying the image data corresponding to the first black separation pixel following the first non-black separation pixel by setting the black separation pixel to the first state and setting the separation pixels for the non-black separations to the second state; and modifying the image data corresponding to the second black separation following the first non-black pixel by pixel setting a separation pixel for a non-black separation to the second state.

DETAILED DESCRIPTION OF THE INVENTION

Figure 1:
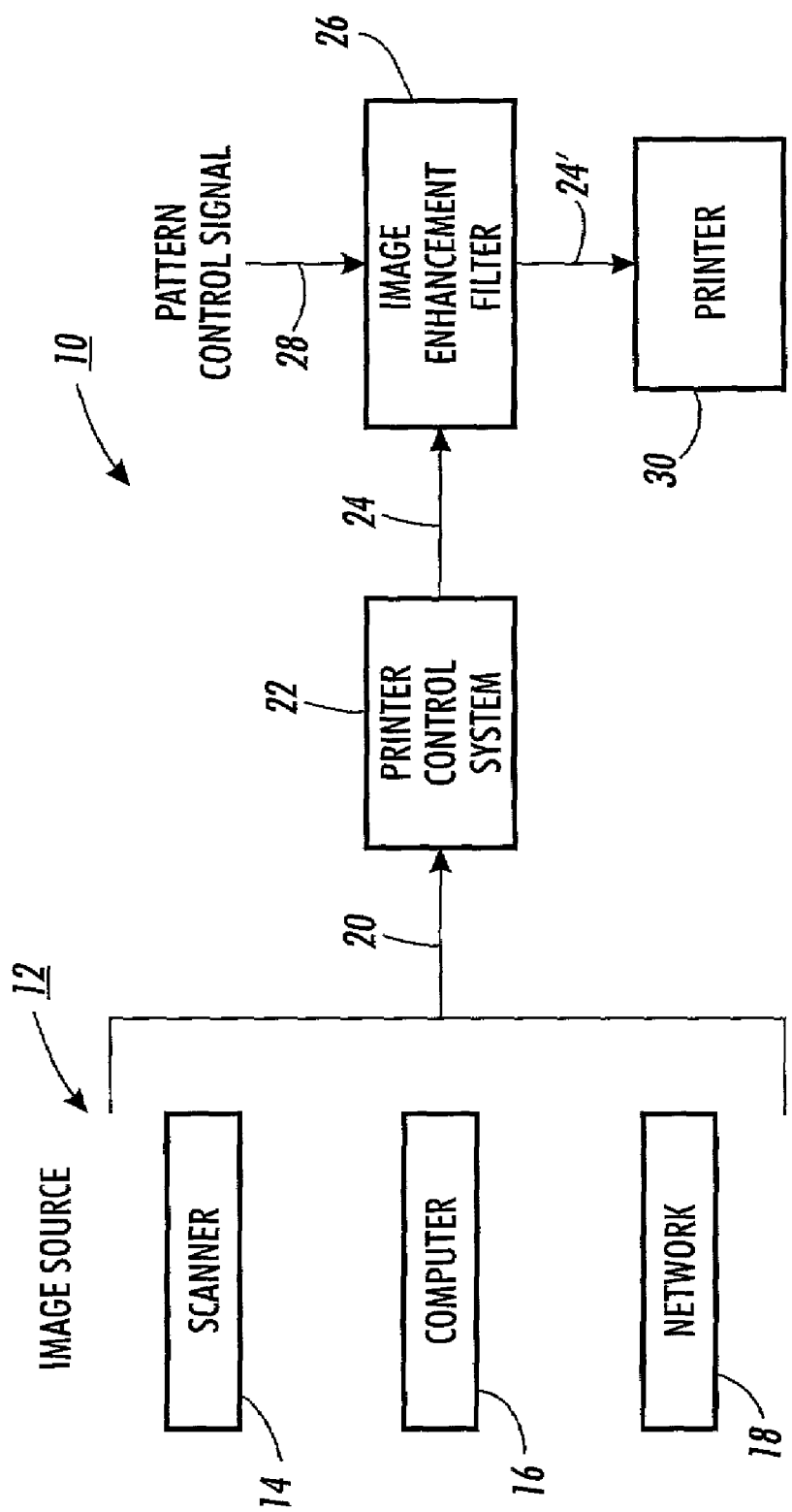
FIG. 1 illustrates a general, schematic representation of a printing system incorporating an enhancement filter for reducing dot placement errors.

The following will be a detailed description of the drawings which are given for purposes of illustrating embodiments of the present invention, and not for purposes of limiting the same. In this description, as well as in the drawings, like reference numbers represent like devices, circuits, or circuits performing equivalent functions.

In the following discussion, the term "dot pattern" refers to a product or an image resulting from printing process. A "pixel pattern" for a given image or text refers to a pattern of pixels of 1's and 0's identifying the location of the "ON" (black) and "OFF" (white) pixels, respectively, in a binary dot pattern for the given image data. That is, the pixel pattern for an image corresponds to the dot pattern formed when the pixel image data is output without any dot placement errors.

Turning now to FIG. 1, there is shown an embodiment of a printing system 10 that incorporates the features of the present invention. Printing system 10 includes image source 12 that may include scanner 14, computer 16, network 18 or any similar or equivalent image input terminal providing image data 20 which may be any combination of ASCII data, bitmapped image, geometric data, graphics primitives, page description language, etc. Image data 20 is supplied to printer control system 22 which processes the received image data 20 to produce print ready data 24. The print ready data is supplied to image enhancement filter 26 which operates to modify print ready data 24 so as to mitigate dot placement errors and generate print ready data 24' which, when output by printer 30, provides improved image and text quality.

More specifically, image enhancement filter 26 is responsive to pattern control signal 28 identifying stray pixel patterns which are associated with pixel placement errors in printer 30. A stray pixel pattern is an arrangement of pixels that, when printed by a given printer, generate dot patterns that exhibit one or more pixel positioning errors. That is, a stray pixel pattern results in a dot pattern that has some kind of pixel misplacement for one or more of the dots within the dot pattern. Image enhancement filter 26 may be implemented in hardware and/or software and may reside within printer control system 22, within printer 30, within a separate component or in any combination thereof. In response to print data 24', which may comprise image data and/or printer control signals (e.g., paper handling, carriage control, ink deposition), printer 30 generates an output image. Printer 30 may comprise an ink deposition printer such as a solid ink printer or an ink jet printer as well as such alternatives as electrophotographic, ionographic, thermal, etc.

The present invention is directed towards aspects of enhancement filter 26 depicted in FIG. 1 and, in particular, is directed to a system and method for enhancing the quality of text and images generated by printing devices. To modify print ready data so as to mitigate dot placement errors and provide improved image and text quality, image enhancement filter 26 operates to identify stray pixel patterns within the received image data and modify the image data to correct the stray pixel pattern. Image enhancement filter 26 can be enabled to perform one or more operations for improving image quality degraded by dot placement errors. In particular, image enhancement filter 26 can be designed to: (a) improve the quality of both text and images (e.g., photographic, halftone, contone, etc.) degraded as a result of dot misplacement; (b) improve the quality of black text degraded as a result of dot misplacement; and/or (c) reduce color banding artifacts resulting from the combined effects of dot misplacement and jet to jet variation.

In describing the operation of image enhancement filter 26, reference will be made to print ready data. For the purpose of such description, print ready data can be considered as comprising raster image describing the image in terms of pixels arranged in scanlines, wherein each pixel may be considered as a binary signal wherein a "1" denotes that a drop of ink will be deposited and a "0" denotes no ink is to be deposited. It will be appreciated that in a printer which can deposit multiple ink drops (or vary the volume of drops) of a single color at a location, a pixel may have multiple states wherein each state corresponds to depositing a different number of ink drops (different drop volume).

For purposes of explanation, the present invention is described as operating on print ready data comprising two or more color planes or separations that are combined to form a composite image. However, it should be appreciated that the present invention is equally applicable to monochrome printing (e.g., black and white) wherein the image data comprises a single separation. Each color plane comprises a raster image describing the image for a color separation in terms of separation pixels arranged in scanlines. Each composite pixel comprises four associated separation pixels, one for each of the CMYK color planes. For purposes of describing the present invention, reference will be made to image data comprising four color planes, Cyan, Magenta, Yellow and blacK (CMYK). Although shown as operating on color image data comprising four separations, it will be appreciated that the principles described herein are equally applicable to color reproduction utilizing a different number of separations as well as a different combination of colors.

For the purpose of discussing the image data, the data will be shown as if printed left to right, regardless of the actual direction of printing. That is, in many printers the printhead reciprocates, printing dots as the printhead traverses the page in each direction. Analogously, in solid ink printers the dots are printed starting from the bottom of the page and moving to the top of the page. To make the representation simpler, we use "left" to mean "down", and "right" to mean "up" in the drawings. Thus, the pattern 110010 would actually be printed on a solid ink printer as shown below:

0
1
0
0
1
1

Since the printhead starts firing from the bottom of the page, the above pattern can be interpreted as "two on, two off, one on, one off", where "on" means a drop of ink is ejected to form a dot, and "off" means no ink is ejected.

Figure 2:
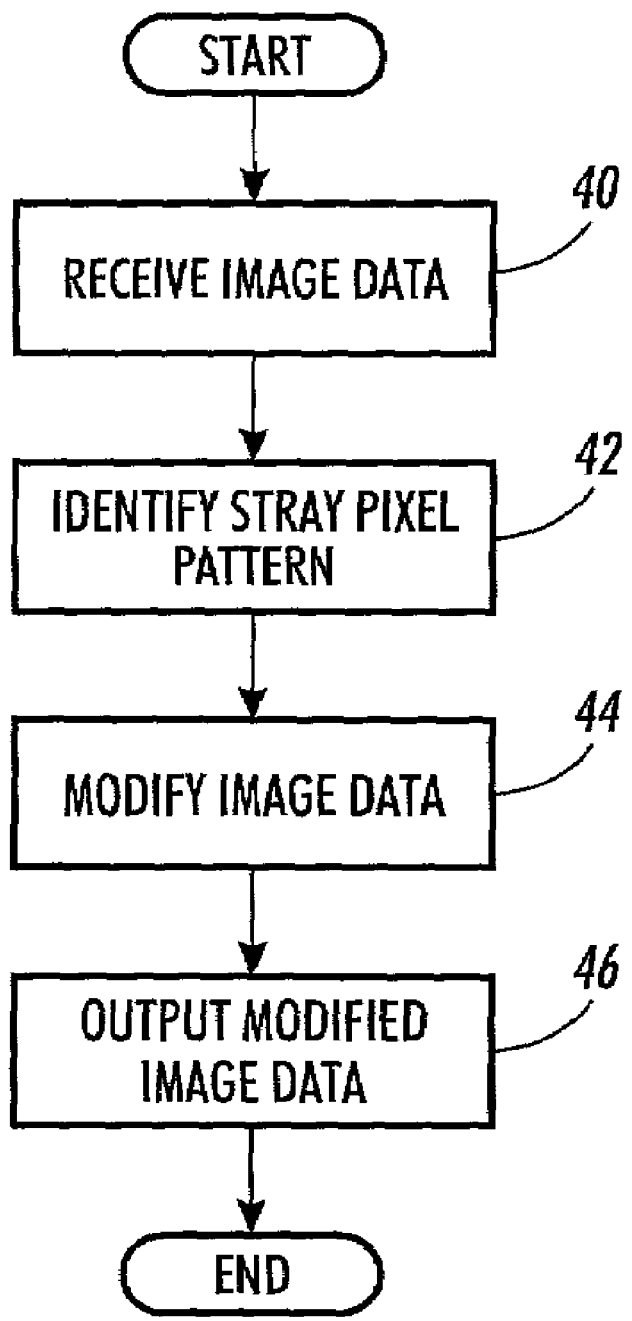
FIG. 2 is a flowchart illustrating a method of operation of an enhancement filter for reducing image artifacts resulting from dot misplacement.

Referring now to FIG. 2, there is shown a flowchart illustrating a method of operation of image enhancement filter 26 for providing improved image quality in more detail. The method illustrated in FIG. 2 includes four general steps of receiving print ready image data (step 40), identifying stray pixel patterns within the image data (step 42), modifying image data associated with the stray pixel pattern (step 44) and providing the modified image data to an output device (step 46). The method illustrated in FIG. 2 can be adapted to (a) improve the quality of both text and pictorial image degraded as a result of dot misplacement; (b) improve the quality of black text degraded as a result of dot misplacement; and/or (c) reduce color banding artifacts resulting from the combined effects of dot misplacement and jet to jet variation.

The process begins with the receipt of print ready data (step 40). Illustratively, the print ready data comprises raster image data of binary pixels. However, it should be appreciated that the pixels need not be binary. At step 42 the received image data is filtered to identify any stray pixel pattern within the received image data. As discussed above, a stray pixel pattern is an arrangement of pixels that, when printed by a given printer, generate dot patterns that exhibits some kind of pixel misplacement for one or more of the pixels within the dot pattern. The stray pixel pattern may be limited to a single separation (e.g., only black dots are misplaced) or be dependent upon one or more separations (e.g., a specific pattern in one separation results in dot misplacements in another separation). Dot misplacement that is dependent on one or more separations can be illustrated with the following example: when printing the pattern KCKKKC, the string of three black pixels following the first cyan pixel can shift the dot placement of the last dot printed while other similar patterns such as KMKKKM, MCMMMC, or KCKKC show little or no dot misplacement. The identification of stray pixel patterns within the received image data can be accomplished using any pattern matching method known in the art including, but not limited to, template matching and vector processing operations.

It should be noted that the method of FIG. 2, assumes a knowledge of the stray pixel patterns at step 42. For purposes of discussing the embodiment of improving the quality of both text and pictorial image degraded as a result of dot misplacement, it will be noted that the pattern 110010 shows some pixel misplacement. With this kind of pattern, the separation pixel indicated by the bold 1, is misplaced, sometimes by as far as several pixels. Other pixel patterns with similar misplacement are 11010, 1100010 and 11000010, where the bold 1 indicates the misplaced pixel, also referred to as a "stray separation pixel" or simply a stray pixel. This kind of misplacement degrades image and text quality significantly. For purpose of illustration, assume that the stray pixels are misplaced (shifted) by approximately one pixel. That is, when printed the stray pixel is printed approximately one pixel late. Thus, pattern 11010 will be printed as 11001 as a result of the stray pixel. Similarly, pattern 110010 will be printed as 1100010; pattern 1100010 will be printed as 1100001; and pattern 11000010 will be printed as 11000001. It should be appreciated that the above patterns are provided by way of example and that other pixel patterns that show some kind of misplacement may be identified for a given printer.

If any stray pixel patterns were identified, step 44 modifies the image data corresponding to the stray pixel pattern to mitigate the effects of pixel placement errors. In one embodiment, pixel placement errors are corrected by changing the image data corresponding to the identified stray pixel pattern to another stray pixel pattern that will result in the correct printed dot pattern. That is, if pattern 110010 is encountered in a separation bitmap, and the pattern is changed to 11010 in the bitmap, the actual printed pattern will look like 110010 because the stray separation pixel in 11010 will be misplaced by one pixel when printed. Similarly, if pattern 1100010 is encountered, the bitmap is changed to 110010. Likewise, pattern 11000010 is changed to 1100010. This way, patterns 110010, 1100010 and 11000010 in the original bitmap will be printed correctly. The only pattern that still prints incorrectly is 11010, since it cannot be changed to another pattern that will result in the correct printed dot pattern.

The above described embodiment can be applied to one or more color separations (e.g., cyan, magenta, yellow and black) to improve the image and text quality degraded as a result of dot misplacement. In doing so, it should be noted that the stray pixel patterns may not be the same for each color separation. For example, one of the separations, say Cyan, may exhibit dot placement errors for the stray pixel patterns discussed above (11010, 110010, 1100010 and 11000010), while another separation, say Magenta, may be sensitive to a different set of patterns such as 110110, 1101010, 11010010 and 110100010.

In another embodiment, the process improves the quality of black text by modifying the image data associated with the stray pixel pattern to replace a stray separation pixel in a black separation with a process black (CMY) composite pixel. As above, print ready data is received at step 40 and filtered at step 42 to identify any stray pixel pattern within the received image data.

At step 44, the image data is modified to correct pixel placement errors by replacing the stray pixel in a black separation with a process black (CMY) composite pixel. For example, in the dot pattern 110010 in the black separation, the stray separation pixel (bold 1) is replaced by a set of overlaying cyan, magenta and yellow dots by modifying the corresponding separation pixels in the non-black (C,M,Y) planes. In this manner, the stray pixel pattern is broken up with the stray black pixel being printed as a process black (CMY) dot. That is, the black dot pattern is reduced to 110000, with the stray separation pixel having been replaced by a 0 (set to not deposit ink) and that black dot has been replaced by a CMY dot. Thus, if the corresponding pattern for each of the cyan, magenta and yellow separations was 000000 before the stray pixel replacement, after replacement the pattern will be 000010.

According to the teachings disclosed herein, there is further provided a parallel processing method that identifies and corrects stray pixel patterns thereby performing steps 42 and 44 in a single operation. Briefly reviewing, some pixel patterns that can cause stray pixels include:

110010

1100010

11000010

11001010

Wherein each pixel pattern shown causes the second to last pixel to go stray. Thus, attention is turned to the second to last pixel (bold 1) in each row. Use K to indicate the stray separation pixel in consideration, R1 to indicate the pixel to the right of the pixel in consideration, L1 to indicate the pixel to the left of the pixel in consideration, L2 to indicate the pixel location that is two pixels to the left of the pixel in consideration, etc. Table 1 illustrates, for several of the rows shown above, the pixel locations indicated by these symbols:

TABLE 1

| L6 | L5 | L4 | L3 | L2 | L1 | K | R1 |
|----|----|----|----|----|----|---|----|
|    |    | 1  | 1  | 0  | 0  | 1 | 0  |
|    | 1  | 1  | 0  | 0  | 0  | 1 | 0  |
| 1  | 1  | 0  | 0  | 0  | 0  | 1 | 0  |
| 1  | 1  | 0  | 0  | 1  | 0  | 1 | 0  |

For the first pattern (110010) to appear, the value of the expression:

$$(K\&(\sim R1\&\sim L1\&\sim L2\&L3\&L4)) \tag{1}$$

has to be 1; wherein "~" is a logical NOT and "&" is a logical AND. To remove the stray pixel, the following operation can be used:

$$K2=K\&\sim(\sim R1\&\sim L1\&\sim L2\&L3\&L4) \tag{2}$$

where K2 is the value of the current pixel after the operation. It can be seen that K2 will be zero for either value of K. That is, with K=0, expression (2) will produce K2 equal to zero as a zero ANDed with either a one or a zero will be zero. With K=1 (e.g., the pattern is 110010), the expression in equation (2) becomes:

$$K2=1\&\sim(\sim0\&\sim0\&\sim0\&1\&1)$$

which reduces to 0 (i.e., K2 is 0 after the above operation), thus removing the stray pixel. The following operation will remove stray pixels for all four patterns shown in Table 1 above:

$$K\&(\sim(\sim R1\&\sim L1\&\sim L2\&L3\&L4)| \sim \qquad (3)$$
$$(\sim R1\&\sim L1\&\sim L2\&\sim L3\&L4\&L5)| \sim$$
$$(\sim R1\&\sim L1\&\sim L2\&\sim L3\&\sim L4\&L5\&L6)| \sim$$
$$(\sim R1\&\sim L1\&L2\&\sim L3\&\sim L4\&L5\&L6))$$

where "|" is an OR operation. The expression can be simplified as:

$$K2=K\&(R1|L1|\sim((\sim L3\&\sim L4\&L5\&L6)|(\sim L2\&L4\&(L3|(\sim L3\&L5)))) \qquad (4)$$

Thus, what has just been described is an operation to identify conditions wherein the current pixel is a stray pixel and to remove the stray pixel. The image data can be read in 32-bit words and 32 bits in a word can be processed simultaneously. The expression of equation (4) is still valid, but the symbols have a slightly different meaning. Specifically, K is the 32-bit word in consideration, R1 is the bitmap data left shifted by one pixel (note that when left shifting the bitmap data, the pixel to the right of the current pixel will line up with the current pixel after shifting); similarly, L1 is the bitmap data right shifted by one pixel, L2 is the bitmap data right shifted by two pixels, etc. When shifting the data, the data above or below the current word may be shifted into the current word, as shown in the following expressions:

R1=(K<<1 & dataup>>31)

L2=(K>>2 & datadn>>30)

L3=(K>>3 & datadn>>29)

L4=(K>>4 & datadn>>28)

L5=(K>>5 & datadn>>27)

L6=(K>>6 & datadn>>26)

where "dataup" is the 32-bit word to the right of (above) the current data and the "datadn" is the 32-bit word to the left of (below) the current data. The same operation applied to a single pixel is now applied to a 32-bit word one time to remove all stray separation pixels in this word.

After removing the stray black pixels from the bitmap, the pixels in the corresponding location of the cyan, magenta and yellow separations need to be updated. Using the following operation:

$$StrayPixels=K2\textasciicircum K \qquad (5)$$

wherein "^" is the exclusive OR. The bits of StrayPixels will be all 0 except for those bits that correspond to stray pixels.

The cyan, magenta and yellow pixels are added to the corresponding stray pixel locations using the following operations:

$$C = C | StrayPixels; \qquad (6)$$
$$M = M | StrayPixels;$$
$$Y = Y | StrayPixels;$$

When this method is applied to bitmap data, black text shows significant improvement. However, because CMY dots are used to replace black dots, chroma may be visible in areas that are supposed to be neutral. This can be improved by adjusting the ratios of cyan, magenta and yellow dots when replacing the stray black pixel. For example, if grays appear yellowish, a cyan dot and a magenta dot can be added where there is a stray black pixel and a yellow dot can be add ⅔ of the times. This method of adjusting the ratios can be applied to correct for the appearance of other colors in gray or black areas.

The process of FIG. 2 can be applied to reduce the severe banding caused by the combination of dot misplacement and jet to jet variation. Briefly, recall that the banding problem is most noticeable in dark color fills, especially in a uniform tertiary color that covers the page with 33% secondary dots (red, green or blue) and 67% black dots. When certain stray pixel patterns are present, dot misplacement can cause some of the color (i.e., non black) dots to overlap the black dots, resulting in large hue shifts and loss of saturation. For example, in pattern KRKKKR, the first R will lose some or most of its red color. The second R may or may not have a problem depending on the subsequent pixels.

The patterns that cause the banding suggest that it is a frequency dependent artifact. To modify the data to make it more robust to such an artifact and reduce banding, step 42 filters the received image data to identify predefined patterns that have one color dot followed by a certain number of black dots. An example of such a pattern is:

K D $K_1$ $K_2$ $K_3$ D where "D" is used to identify any color (non-black) pixel such as a C, M or Y separation pixel as well as a secondary color (red, green, blue); and $K_1$, $K_2$ and $K_3$ indicate the three black pixels following the first D.

To correct the above pattern, the first black pixel $K_1$ following the D is identified as the stray pixel and is replaced by a set of CMY dots, Additionally, D is added to the second black pixel $K_2$. That is, the pattern "K D $K_1$ $K_2$ $K_3$ D" becomes "K D (C+M+Y) (K+D) K D", wherein the dots inside () are for the same composite pixel location. This way, the D is no longer an isolated D followed by black pixels. Three consecutive Ds are printed in the new pattern. This changes the frequency behavior of the color dots and make the color dots print more consistently.

The above process must be calibrated for a given printer. For example, if the color dot D above is a cyan dot, for a given printer experiments show that three consecutive cyan dots are needed. However, for dots D comprising other colors, the calibration is used to determine what other colors are needed in those pixel locations. The criterion used in the calibration procedure is to achieve/match the original intended color as much as possible. In the calibration procedure, it was found that "K C (C+M+Y) (K+C) K C" produces a similar color as "K C ($K_1$) ($K_2$) ($K_3$) C" when the latter prints without dot position errors, which can be simulated by reducing the jetting frequency.

Often there can be several patterns that result in some banding. However, it can be an advantage to correct only the worst patterns in order to minimize processing time. Furthermore, limiting the number of patterns corrected also helps to limit the ink coverage to a desirable level. As can be seen from the example above, the corrected pattern has more ink than the uncorrected pattern, so correcting multiple patterns can exceed the desired maximum ink coverage.

A problem occurs with the above process for correcting banding when a lot of black dots are printed with a very small number of color dots, such as in the pattern "KCKKKKKKKKKC". When the above pattern is modified to "KC(C+M+Y)(K+C)KKKKKKKC", the three consecutive pixel locations C(C+M+Y)(K+C) form a big colored dot that can be visible in a background of black dots. Such an occurrence of an isolated colored dot causes objectionable image artifacts. These artifacts can be avoided by limiting the patterns identified to those patterns with no more than a certain number of black dots. For example, if a colored dot is followed by more than 10 black pixels, do not change this pattern. Preferably, limiting the string of successive black dots from 4 to 7 works best. That is, very dark colors with more than about 80% black are not corrected. However, these colors typically have much less banding than colors with a smaller percentage (about 65%) black in the first place. Although, it is understood that for given printers and given colors, a string of more or less black dots may be appropriate.

The disclosed system and method may be readily implemented entirely in software or implemented partially or fully in hardware using standard logic circuits or specifically on a single chip using VLSI design. Whether software or hardware is used to implement the system varies depending on the speed and efficiency requirements of the system and also the particular function and the particular software or hardware systems and the particular microprocessor or microcomputer systems being utilized. The image processing system, however, can be readily developed by those skilled in the applicable arts without undue experimentation from the functional description provided herein together with a general knowledge of the computer arts.

While this invention has been described in conjunction with specific embodiments thereof, it is evident that many alternatives, modifications, and variations will be apparent to those skilled in the art. Accordingly, it is intended to embrace all such alternatives, modifications and variations as fall within the spirit and broad scope of the appended claims. The recited order of processing elements or sequences, or the use of numbers, letters, or other designations therefor, is not intended to limit the claimed process to any order except as specified in the claim itself. Thus, it will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method of improving image quality, the method comprising:

receiving image data comprising a plurality of color planes, the color planes including at least one black separation and at least one non-black separation, wherein each color separation comprises an array of separation pixels, each separation pixel having at least two states, a first state corresponding to depositing no ink and a second state corresponding to depositing ink;

identifying a stray pixel pattern within the image data, the stray pixel pattern including a stray separation pixel which corresponds to a misplaced dot in a dot pattern; and modifying the image data corresponding to the stray pixel pattern, the modification of the image data including setting the stray separation pixel to the first state and setting a second separation pixel within the stray pixel pattern to the second state.

2. The method of claim 1, wherein identifying a stray pixel pattern within the image data identifies one of several predetermined pixel patterns within a first color separation and wherein setting a second separation pixel within the stray pixel pattern to the second state comprises changing the image data in the first color separation to a pixel pattern that results in a dot pattern corresponding to the stray pixel pattern identified.

3. The method of claim 1, wherein identifying a stray pixel pattern within the image data identifies one of several predetermined pixel patterns within the black separation and wherein setting a second separation pixel within the stray pixel pattern to the second state comprises setting each of the separation pixels in the non-black separations corresponding to the stray separation pixel to the second state.

4. The method of claim 1, wherein identifying a stray pixel pattern and modifying the image data corresponding to the stray pixel pattern are determined in accordance with $$K2 = K \& (R1 | L1 | \sim ((\sim L3 \& \sim L4 \& L5 \& L6) | (\sim L2 \& L4 \& (L3 | (\sim L3 \& L5)))))$$

$$\text{StrayPixels} = K2 \char`\^ K$$

$$C = C | \text{StrayPixels};$$

$$M = M | \text{StrayPixels};$$

$$Y = Y | \text{StrayPixels};$$

wherein K is an n-bit word of image data for the black separation, R1 is the n-bit word of image data left shifted by one pixel, L1, L2, L3, L4, L5, and L6 are the n-bit word of image data right shifted by 1, 2, 3, 4, 5 and 6 pixels, respectively, C, M and Y are the n-bit word of image data for cyan, magenta and yellow separations, ~ is a logical NOT, & is a logical AND, | is a logical OR, and ^ is an exclusive OR.

5. The method of claim 1, wherein identifying a stray pixel pattern within the image data identifies a pixel pattern comprising a pair of non-black pixels separated by a predetermined number of black only pixels and wherein setting a second separation pixel within the stray pixel pattern to the second state comprises setting each of the separation pixels in the non-black separations corresponding to the first black only pixel following the first non-black pixel to the second state.

6. The method of claim 5, wherein setting a second separation pixel within the stray pixel pattern to the second state further comprises setting a non-black separation pixel corresponding to the second black only pixel following the first non-black pixel to the second state.

7. A method of improving the quality of text output, the method comprising:

receiving image data comprising a plurality of pixels, each pixel having at least two states, a first state corresponding to depositing no ink and a second state corresponding to depositing ink;

identifying a stray pixel pattern within the image data, the stray pixel pattern including a stray pixel corresponding to a misplaced dot in a dot pattern; and modifying the image data corresponding to the stray pixel pattern to match a second stray pixel pattern, the second stray pixel pattern including a second stray pixel corresponding to a misplaced dot in a dot pattern, the second stray pixel pattern being selected to produce a dot pattern corresponding to the stray pixel pattern the modifying including setting the stray pixel to the first state and changing a second pixel within the stray pixel pattern from the first state to the second state, the second pixel being selected to produce a dot pattern corresponding to the stray pixel pattern.

8. The method according to claim 7, wherein the received image data comprises a raster image and the second pixel is adjacent to the stray pixel in the raster image.

9. The method according to claim 7, wherein the stray pixel pattern includes at least one pattern from 11010, 110010, 1100010 and 11000010.

10. A method of improving image quality, the method comprising:

receiving image data comprising a plurality of color planes, the color planes including a black separation and at least two non-black separations, wherein each color separation comprises an array of separation pixels, each separation pixel having at least two states, a first state corresponding to depositing no ink and a second state corresponding to depositing ink;

identifying a stray pixel pattern within the image data, the stray pixel pattern comprising a pair of non-black separation pixels having a second state separated by a predetermined number of black separation pixels having a second state;

modifying the image data corresponding to the first black separation pixel following the first non-black separation pixel by setting the black separation pixel to the first state and setting the separation pixels for the non-black separations to the second state; and modifying the image data corresponding to the second black separation following the first non-black pixel by pixel setting a separation pixel for a non-black separation to the second state.

11. The method of claim 10, wherein the predetermined number of number of black separation pixels having a second state separating the pair of non-black separation pixels is selected from 3 to 7 pixels.

* * * * *